United States Patent
Öberg

(10) Patent No.: US 10,108,169 B2
(45) Date of Patent: Oct. 23, 2018

(54) POWER TOOL

(71) Applicant: ATLAS COPCO INDUSTRIAL TECHNIQUE AB, Stockholm (SE)

(72) Inventor: Hans Niklas Öberg, Nacka (SE)

(73) Assignee: Atlas Copco Industrial Technique AB, Stockholm (SE)

( * ) Notice: Subject to any disclaimer, the term of this patent is extended or adjusted under 35 U.S.C. 154(b) by 415 days.

(21) Appl. No.: 14/779,463

(22) PCT Filed: Apr. 11, 2014

(86) PCT No.: PCT/EP2014/057423
§ 371 (c)(1),
(2) Date: Sep. 23, 2015

(87) PCT Pub. No.: WO2014/170236
PCT Pub. Date: Oct. 23, 2014

(65) Prior Publication Data
US 2016/0054721 A1 Feb. 25, 2016

(30) Foreign Application Priority Data
Apr. 16, 2013 (SE) ...................... 1350477

(51) Int. Cl.
*B25B 21/00* (2006.01)
*G05B 19/18* (2006.01)
*B25F 5/00* (2006.01)
*B25B 23/14* (2006.01)

(52) U.S. Cl.
CPC ............ *G05B 19/182* (2013.01); *B25B 21/00* (2013.01); *B25B 23/14* (2013.01); *B25F 5/00* (2013.01); *G05B 2219/32128* (2013.01)

(58) Field of Classification Search
None
See application file for complete search history.

(56) References Cited

U.S. PATENT DOCUMENTS

| | | |
|---|---|---|
| 7,594,548 B1 | 9/2009 | Puzio et al. |
| 2003/0196824 A1* | 10/2003 | Gass ................ B23B 31/123 173/131 |
| 2005/0000998 A1 | 1/2005 | Grazioli et al. |
| 2010/0156676 A1 | 6/2010 | Mooring et al. |
| 2011/0203821 A1* | 8/2011 | Puzio ............... B25B 23/0064 173/1 |
| 2013/0002538 A1 | 1/2013 | Mooring et al. |

OTHER PUBLICATIONS

International Search Report (ISR) dated Aug. 1, 2014 issued in International Application No. PCT/EP2014/057423.

* cited by examiner

*Primary Examiner* — Paul B Yanchus, III
(74) *Attorney, Agent, or Firm* — Holtz, Holtz & Volek PC

(57) ABSTRACT

A power tool, which includes or is connectable to a computerized unit including a user interface, includes: a portable tool body supporting a motion sensor unit; and an activation unit by which the power tool may be set in two different modes, one production mode and one user interaction mode in which the power tool is configured to provide data from the motion sensor unit to interact with the user interface, such that a movement of the tool body is translated into an input to the user interface.

20 Claims, 3 Drawing Sheets

POWER TOOL

The invention relates to a power tool and a method of interacting with a user interface using a power tool.

BACKGROUND

Power tools are used in various applications and include nutrunners, power wrenches, drilling power tools, cutting power tools, grinding power tools, routers, screwing power tools etc., as well as other handheld industrial tools such as torque wrenches, dispensers etc.

Such power tools may comprise or be connectable to a computerised unit e.g. for monitoring and governing the operation of the tool, or which is included in a process line wherein the tool is used. Such a computerised unit may comprise a user interface for allowing the user to interact with the unit, e.g. to set various parameters or respond to various events in the unit. The tool may further be provided with a computerised unit, carried by the tool itself, and comprising a user interface.

Typically, this interaction has been enabled by means of buttons, keyboards or various pointing devices such as computer mice, touchpads or touchscreens.

When interacting with the user interface while using the tool, the user may be restrained by protective clothing (e.g. gloves). This makes interaction with the user interface difficult. Furthermore, if the user needs to release the power tool to be able to interact with the unit, the industrial process is interrupted and valuable time is lost.

Hence, there is a need for improving the interaction between the user of a power tool and the computerised unit.

SUMMARY OF THE INVENTION

An object of the invention is to reduce the shortcomings previously discussed, and in particular to provide an improved power tool wherein the interaction between the user of the tool and a computerised unit comprised in or connected to the tool is facilitated.

Thus the invention relates to a power tool comprising a portable tool body supporting a motion sensor unit, which tool comprises or is connectable to a computerised unit comprising a user interface. The power tool comprises an activation means by means of which the power tool may be set in two different modes, one production mode and one user interaction mode in which the power tool is configured to provide data from the motion sensor unit to interact with the user interface, such that a movement of the tool is translated into an input to the user interface.

The power tool may be a portable power tool for use in industrial applications, e.g. including drilling power tools, cutting power tools, grinding power tools, routers, screwing power tools, power wrenches, nutrunners and the like. The power tool may be actuated by means of electrical motors or by means of compressed air (air tools).

The user interface may comprise input means adapted to receive input to manipulate the computerised unit, and may further comprise output means adapted to provide an output to the user.

The motion sensor unit may be integrated in the tool body or rigidly mounted to the tool body, e.g. as an add-on to the tool.

The motion sensor unit may comprise one or more inertia sensors. The motion sensor unit may thus comprise a gyroscope configured to detect a rotation of the tool body. Thus the rotation of the tool body may be translated into an input to the user interface. The gyroscope may be a single axis gyroscope or a plural axis gyroscope, thus configured to detect a rotation of the tool around one or more axes of rotation. It may be e.g. a vibrating structure gyroscope (vibrating beam, ring, fork etc.), a MEMS-based gyroscope, a fibre optic gyroscope and/or a dynamically tuned gyroscope.

The motion sensor unit may comprise an accelerometer configured to detect an acceleration of the tool body. Thus the acceleration (e.g. a linear acceleration) of the tool body may be translated into an input to the user interface. The accelerometer may be a single axis accelerometer or a plural axis accelerometer, thus configured to detect an acceleration of the tool along one or more axes of acceleration. Thus any type of gesture performed by the tool body may be translated into an input to the user interface.

The computerised unit and/or the user interface may be comprised in the tool, e.g. integrated in or mounted to the tool body. The user interface may be e.g. in the form of a display on the tool.

The tool may alternatively be separate from and connectable to the computerised unit. Thus the computerised unit may be a separate unit from the tool. The tool may be connectable to the computerised unit by means of wired or wireless connection.

The computerised unit may e.g. be configured for controlling the tool (i.e. a controller). A controller is configured for monitoring and governing the operation of the tool. Thus data from the motion sensor unit may be provided to interact with the user interface of the controller in order to interact with the controller to e.g. set various operational parameters or to respond to various events in the controller. One or more tools may be connected or connectable to the same controller. The tool may be connected to the controller during only parts of the operation of the tool, and disconnected from the controller during other parts of the operation, i.e. for stand-alone operation.

The user interface may comprise alert signal means, such as providing light alerts and/or sound alerts to the user of the tool.

The user interface may comprise a graphical user interface (GUI). The GUI may comprise a menu, one or more selectable items, a pointer, different views providing different types of information etc, and combinations thereof.

The tool may be configured to provide data from the motion sensor unit to navigating a menu in the GUI, to selecting an item in the GUI, to controlling a pointer in the GUI, to confirming a selection or action in the GUI, to switching between different views in the GUI, and combinations thereof.

The movement of the tool body may be translated into an input to the user interface by identifying one or more gestures, which may be predetermined gestures. Gestures may include any movement of the tool body in free air, i.e. when not engaged with the work piece. Alternatively, or in addition, the tool may be provided with a mode for setting gestures. Thus gestures may be captured by the motion sensor unit and associated with a selected action or a selected set of actions in the user interface.

The tool may further comprise an activation means, wherein the tool is configured to provide data from the motion sensor unit to interact with the user interface when the activation means is activated. The activation means may thus comprise a button, whereby the activation may comprise pressing the button. The activation means may be integrated in or mounted to the tool body. The activation means may comprise any other means for activation, e.g. a sliding or rotating ring, a touch device etc. By the activation means the risk for undesired interaction with the user interface while working with the tool is reduced. The activation means may alternatively be activated when the tool body is in a predetermined physical position, or at predetermined step of operation of the tool.

The tool may comprise a processing unit connected to the motion sensor unit and to the user interface, and wherein the processing unit is configured to receiving movement data from the motion sensor unit representing a movement of the tool body, translating the movement data into commands which are provided as input to the user interface, and manipulating the user interface to take into account the commands provided as input based on the movement data.

Thus the movement of the tool may be translated into an input to the user interface by means of commands based on the movement data.

The invention further relates to a power tool system comprising the power tool as disclosed herein and a computerised unit comprising a user interface, wherein the tool is connectable to the computerised unit to interact with the user interface, such that a movement of the tool body is translated into an input to the user interface.

The invention further relates to a method of interacting with a user interface of a computerised unit comprising providing a power tool as disclosed herein, moving the tool body, and providing data from the motion sensor unit of the tool to interact with the user interface of the computerised unit such that a movement of the tool body is translated into an input to the user interface.

Moving the tool body may comprise rotating the tool body and/or accelerating the tool body. Moving the tool body may comprise performing a predetermined gesture, which gesture is associated with a specific action or a specific set of actions in the user interface.

Interacting with the user interface may comprise interacting with a GUI of the user interface by navigating a menu in the GUI, selecting an item in the GUI, controlling a pointer in the GUI, confirming a selection or action in the GUI, switching between different views in the GUI, or combinations thereof.

The method may comprise providing data from the motion sensor unit to interact with the user interface upon the user activating an activation means.

The method may comprise setting the tool in an interaction mode, receiving movement data from the motion sensor unit representing a movement of the tool body, translating the movement data into commands which are provided as input to the user interface, and manipulating the user interface to take into account the commands provided as input based on the movement data.

Other features and advantages of the invention will be apparent from the figures and from the detailed description of the shown embodiment.

SHORT DESCRIPTION OF THE DRAWINGS

In the following detailed description reference is made to the accompanying drawings, of which:

DETAILED DESCRIPTION OF THE SHOWN EMBODIMENT OF THE INVENTION

Figure 1:
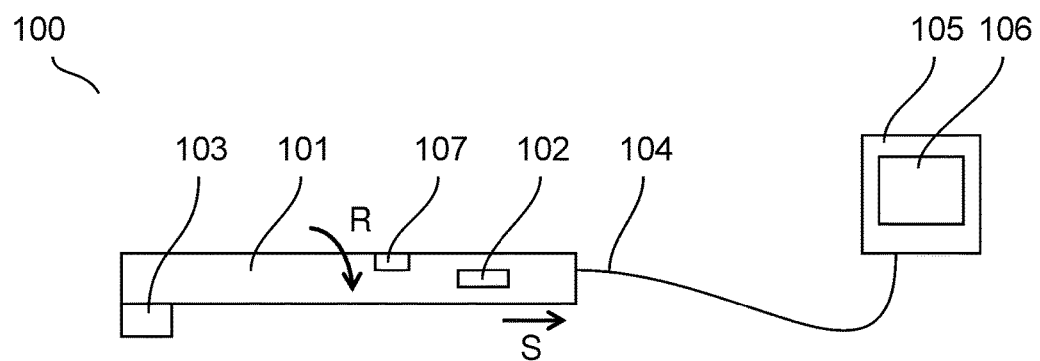
FIG. 1 shows a schematic drawing of a power tool according to a first embodiment of the invention.

With reference to FIG. 1, a power tool 100 according to a first embodiment of the invention is described. The tool comprises a portable tool body 101 supporting a motion sensor unit 102. By portable it is defined that the tool is for hand held use, but the tool body may still be connected to auxiliary equipment such as control units and power sources by means of wires and the like, which may be comprised by the power tool. The motion sensor unit typically comprises a gyroscope configured to detect a rotation of the tool body, such as a rotation R, and an accelerometer configured to detect a linear acceleration of the tool body, such as a linear acceleration S. As illustrated the motion sensor unit is integrated in the tool body, but the motion sensor unit may alternatively be comprised in a unit that is mounted to the tool body of an existing tool.

The tool further comprises a tool head 103 to engage with a workpiece to be worked with the tool. The tool may be a portable power tool, e.g. a drilling tool, a cutting tool, a grinding tool, a router, a screwing tool, a power wrench, a nutrunner and the like. Thus the tool head may comprise holding means for drills, cutting means, grinding means, routing bits, screwing bits, wrench or nut sockets and the like.

The tool is connectable to a computerised unit 105 comprising a user interface 106 by means of a wire connection 104. In the first embodiment the unit is configured for controlling the tool (i.e. a controller). The controller is configured for monitoring and governing the operation of the tool.

The user interface 106 comprises a graphical user interface (GUI) which may comprise menus, one or more selectable items and/or different views or screen providing different types of information etc. The user may interact with the user interface to make selections, settings, changing views and/or responding to alerts etc.

The tool further comprises an activation means 107 in the form of a button on the tool body. Upon the user pressing the activation button, data from the motion sensor unit is captured and transmitted to the computerised unit 105 to provide input to the user interface 106 and interact with the user interface.

As an alternative the activation means 107 may function as an activator between two modes. A first mode is a production mode in which the tool is adapted to be productive, i.e. if the tool is a nutrunner it is adapted to provide a torque in order to tighten nuts. In the production mode it is preferably restricted from user interaction other than activation of the tool bit or the like. A second mode is a user interaction mode in which the sensor unit is activated so as to sense operator initiated movements corresponding to specific commands that will be transmitted to the computerised unit 105 to provide input to the user interface 106 and interact with the user interface.

Hence, in the user interaction mode the operator may e.g. navigate between different operation options or settings in order to prepare the tool for the next operation.

Movement data from the motion sensor unit captured and transmitted to the computerised unit is analysed to translate specific movements and/or gestures of the tool body into input commands to the user interface. Thus a movement of the tool body, e.g. in the form of a gesture, is translated into an input to the user interface. A gesture may typically include any movement of the tool body while not being engaged with the workpiece.

One example of gestures includes a swift rotation R of the tool body in a predetermined angular range around an axis of the tool body. For elongated tools as the one illustrated, the axis may be along the direction of elongation of the tool body. This may e.g. be translated into a navigating action in a menu, a switching between different views in the GUI or cancelling an alert. Typically the rotation of the tool body clock-wise and counter clock-wise represent different (or opposite) actions, e.g. opposite directions in navigating a menu or opposite directions in switching between different views in the GUI, or cancelling vs. approving alerts. The axis may alternatively be angled, e.g. perpendicular, to a direction of elongation of the tool body.

Another example of gestures includes a swift movement S along an axis of the tool body, e.g. along the direction of elongation of the tool body. This may e.g. be translated into a selecting action, selecting a selectable item in the GUI, such that in a menu.

Yet another example of gestures include more complex patterns of movement of the tool body, such that drawing symbols in the air (e.g. resembling characters, such as W, U, I, O, S, D, L, Z, N, M etc., digits, e.g. 0, 1, 2, 3, 5 etc.) or any kind of two- or more dimensional movement pattern.

The tool may further be provided with a mode for setting gestures. Thus gestures may be captured by the motion sensor unit and associated with a selected action or a selected set of actions in the user interface, allowing association with any kind of two- or more dimensional movement pattern.

Yet another example of providing data from the motion sensor unit to interact with the user interface comprises translating movement of the tool body in a plane to control a pointer in the GUI. The plane may be a plane parallel to or perpendicular to an axis of the tool body. Again, a swift movement of the tool body may be interpreted as a selecting action, selecting an item in the GUI at the location of the pointer.

Figure 2:
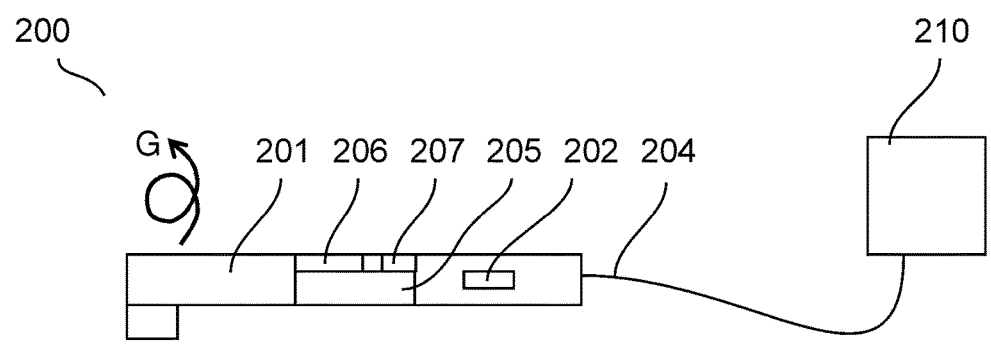
FIG. 2 shows a schematic drawing of a power tool according to a second embodiment of the invention.

With reference to FIG. 2, a power tool 200 according to a second embodiment of the invention is described. This embodiment differs from the embodiment previously disclosed in that the computerised unit 205 and the user interface 206 is comprised in the portable tool body 201.

The tool further comprises a motion sensor unit 202 as described previously.

The user interface 206 may e.g. comprise a GUI with menus, one or more selectable items and/or different views or screen providing different types of information etc. By activating the activation means 207 the user may interact with the user interface on the tool by gestures to make selections, settings, changing views and/or responding to alerts etc. Data from the motion sensor unit is thereby provided to the computerised unit 205 to interact with the user interface 206, such that a movement of the tool body, e.g. in the form of a gesture G, is translated into an input to the user interface.

The tool is further connected, via a connection 204, to a controller 210 configured for monitoring and governing the operation of the tool. The connection 204 may comprise one or more wired and/or wireless connections. Thus the tool and the controller may comprise wireless connectivity units, implementing wireless communication protocols. The controller 210 is thereby connected to the unit 205 to exchange data.

Figure 3:
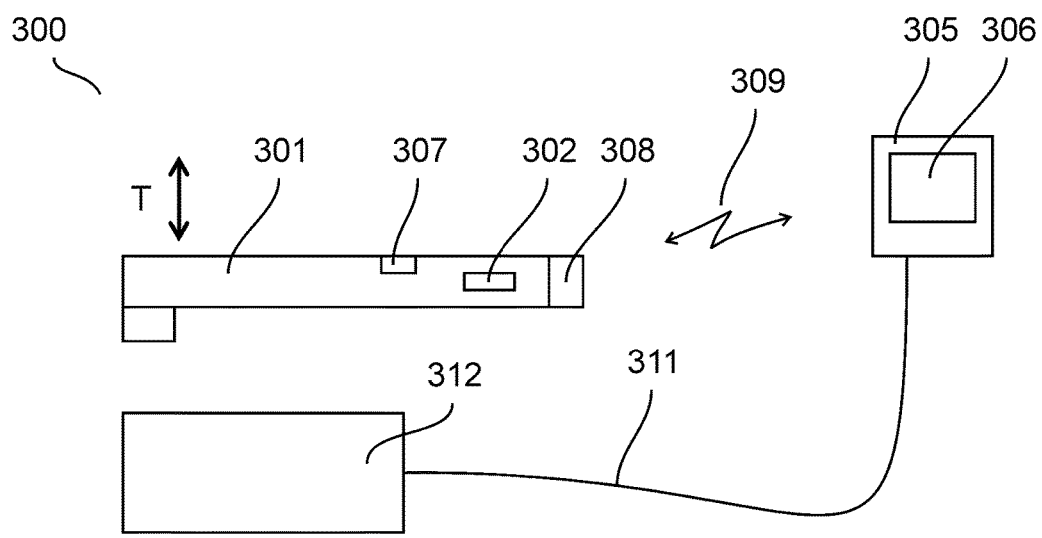
FIG. 3 shows a schematic drawing of a power tool according to a third embodiment of the invention.

With reference to FIG. 3, a power tool 300 according to a third embodiment of the invention is described. The power tool comprises a portable tool body 301 supporting a motion sensor unit 302 and an activation means 307. This embodiment differs from the embodiments previously disclosed in that the tool is connected, via a connection 309, e.g. by means of wireless technology, to a computerised unit 305 comprising a user interface 306. The wireless connectivity is enabled by the tool comprising a wireless connectivity unit 308. Further, the computerised unit 305 is a control unit for a production or assembly line and the like. The illustrated line element 312 may correspond to a work station or an assembly station in the production or assembly line. The computerised unit 305 is connected, 311, to the line element 312 for monitoring and governing the operation of the line element.

The computerised unit 305 comprises a user interface 306, e.g. including a display with a GUI and/or alert signal means, such as providing light alerts and/or sound alerts to an operator at the line element.

The tool is configured to provide data from the motion sensor unit to interact with the user interface, such that a movement of the tool body is translated into an input to the user interface. As an example, this may comprise a translational movement T of the tool body in a plane to control a pointer in a GUI of the user interface. The plane may be a plane parallel to or perpendicular to an axis of the tool body. Again, a swift movement of the tool body in another direction may be interpreted as a selecting action, selecting an item in the GUI at the location of the pointer (i.e. corresponding to a click or double click action of a computer pointing device such as a computer mouse).

Further, data from the motion sensor unit may be used to interact with the user interface to confirm/cancel alert signals to the operator at the line element of the line.

Figure 4:
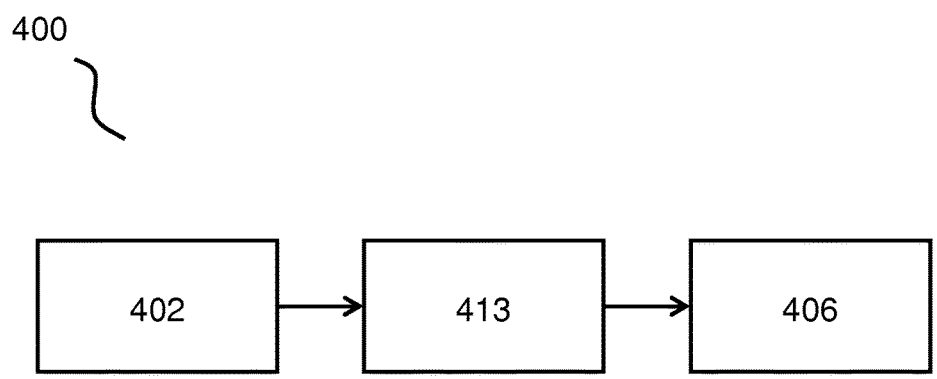
FIG. 4 shows a flow chart of a method of interacting with a user interface of a computerised unit.

With reference to FIG. 4, a block diagram of parts of a power tool 400 according to an embodiment of the invention is shown. The motion sensor unit 402 on the tool body captures movement data relating to the movement of the tool body. Movement data is provided from the motion sensor unit to a processing unit 413. In the processing unit, the movement data is translated into commands which are provided as input to the user interface 406. The user interface is thereafter modified to take into account the commands provided as input based on the movement data. This may include e.g. a navigation of a menu in a GUI of the user interface, a selection of an item in the GUI, a movement of a pointer in the GUI, a confirmation of a selection or action in the GUI, a switching of view between a plurality of views in the GUI, etc.

Figure 5:
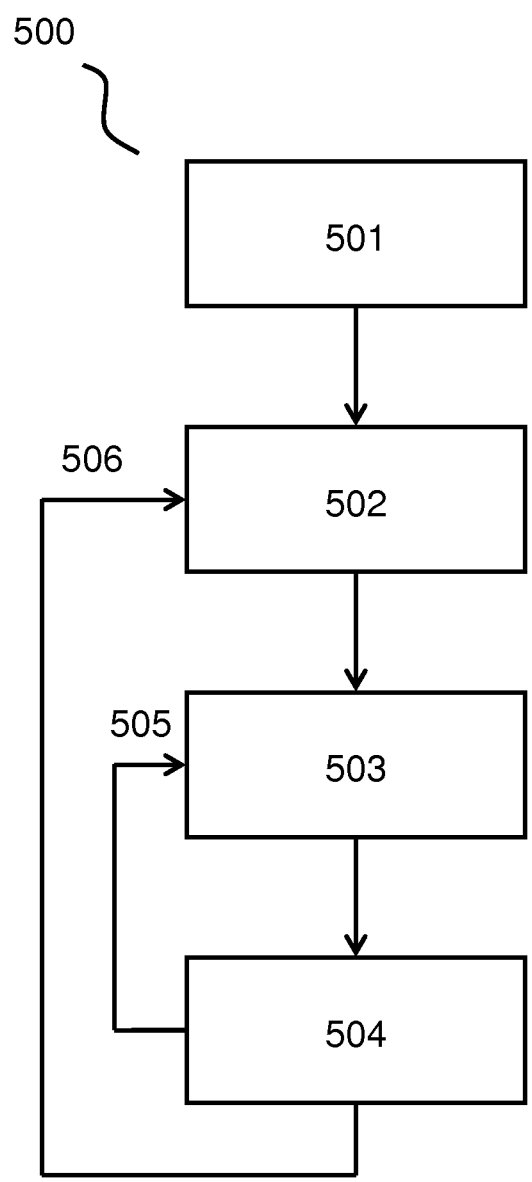
FIG. 5 shows a block diagram of a power tool according to an embodiment of the invention.

With reference to FIG. 5 a flow chart of a method of interacting with a user interface of a computerised unit is disclosed. This method is applicable to any one of the previously described embodiments of tools.

The method 500 comprises providing 501 a power tool as disclosed herein and initiating or activating 502 a motion capture mode in the tool and thereafter moving 503 the tool body, wherein the movement of the tool body is captured by the motion sensor unit as movement data. Captured data is provided from the motion sensor unit of the tool to interact with 504 the user interface of the computerised unit such that the movement data from the motion sensor unit, representing a movement of the tool body, is translated into an input to the user interface.

While activated, the capturing of movement 503 of the tool body and the interacting 504 with the user interface may be iterated in a loop 504 until the motion capture mode is deactivated, e.g. by depressing the activation means.

Further, the method may be iterated in loop 506 taking into account another activation event 502, whereby the steps 503 and 504, and even the loop 505 are reiterated.

Parts of the method are disclosed in further detail in relation to FIG. 1-4.

Further, the movement 503 of the tool body may comprise rotating the tool and/or accelerating the tool body. Interacting 504 with the user interface may comprise interacting with a GUI of the user interface by navigating a menu in the GUI, selecting an item in the GUI, controlling a pointer in the GUI, confirming a selection or action in the GUI, switching between different views in the GUI, or combinations thereof.

Above, the invention has been described with reference to specific embodiments. The invention is however not limited to these embodiments. It is obvious to a person skilled in the art that certain variation may be made within the scope of the invention, which is defined by the following claims.

The invention claimed is:

1. A power tool, which comprises or is connectable to a computerised unit comprising a user interface, the power tool comprising:
   a portable tool body supporting a motion sensor unit; and
   an activation unit which is operable to set the power tool in two different modes, the two different modes including one production mode and one user interaction mode in which the power tool is configured to provide data from the motion sensor unit to interact with the user interface, such that a movement of the tool body detected by the motion sensor unit is translated into an input to the user interface.

2. The power tool according to claim 1,
   wherein the motion sensor unit comprises a gyroscope configured to detect a rotation of the tool body; and
   wherein the rotation of the tool body is translated into an input to the user interface.

3. The power tool according to claim 1,
   wherein the motion sensor unit comprises an accelerometer configured to detect an acceleration of the tool body; and
   wherein the acceleration of the tool body is translated into an input to the user interface.

4. The power tool according to claim 1, wherein the user interface is comprised in the power tool.

5. The power tool according to claim 1, wherein the power tool is separate from and connectable to the computerised unit.

6. The power tool according to claim 4, wherein the computerised unit is configured for controlling the power tool.

7. The power tool according to claim 1, wherein the user interface comprises a graphical user interface (GUI).

8. The power tool according to claim 7, wherein the power tool is configured to provide data from the motion sensor unit to navigate a menu in the GUI, to select an item in the GUI, to control a pointer in the GUI, to confirm a selection or action in the GUI, to switch between different views in the GUI, or combinations thereof.

9. The power tool according to claim 1, wherein the power tool is configured to provide data from the motion sensor unit to interact with the user interface when the activation unit is activated.

10. The power tool according to claim 1, further comprising a processing unit connected to the motion sensor unit and to the user interface, and wherein the processing unit is configured to:
    receive movement data from the motion sensor unit representing the movement of the tool body;
    translate the movement data into commands which are provided as input to the user interface; and
    manipulate the user interface to take into account the commands provided as input based on the movement data.

11. A power tool system comprising:
    the power tool according to claim 1; and
    the computerised unit comprising the user interface,
    wherein the power tool is connectable to the computerised unit to interact with the user interface, such that the movement of the tool body is translated into an input to the user interface.

12. A method of interacting with the user interface of the computerised unit, the method comprising:
    providing the power tool according to claim 1;
    setting the power tool in the user interaction mode;
    moving the tool body; and
    providing data from the motion sensor unit of the power tool to interact with the user interface of the computerised unit such that the movement of the tool body is translated into an input to the user interface.

13. A method of interacting with the user interface of the computerised unit, the method comprising:
    providing the power tool system according to claim 11;
    setting the power tool in the user interaction mode;
    moving the tool body; and
    providing data from the motion sensor unit of the power tool to interact with the user interface of the computerised unit such that the movement of the tool body is translated into an input to the user interface.

14. The method according to claim 12, wherein moving the tool body comprises at least one of rotating the tool body and accelerating the tool body.

15. The method according to claim 13, wherein moving the tool body comprises at least one of rotating the tool body and accelerating the tool body.

16. The method according to claim 12, wherein interacting with the user interface comprises at least one of interacting with a graphical user interface (GUI) of the user interface by navigating a menu in the GUI, selecting an item in the GUI, controlling a pointer in the GUI, confirming a selection or action in the GUI, and switching between different views in the GUI.

17. The method according to claim 13, wherein interacting with the user interface comprises at least one of interacting with a graphical user interface (GUI) of the user interface by navigating a menu in the GUI, selecting an item in the GUI, controlling a pointer in the GUI, confirming a selection or action in the GUI, and switching between different views in the GUI.

18. The method according to claim 12, further comprising providing data from the motion sensor unit to interact with the user interface upon the user activating the activation unit.

19. The method according to claim 13, further comprising providing data from the motion sensor unit to interact with the user interface upon the user activating the activation unit.

20. The method according to claim 12, further comprising:
- receiving movement data from the motion sensor unit representing the movement of the tool body;
- translating the movement data into commands which are provided as input to the user interface; and
- manipulating the user interface to take into account the commands provided as input based on the movement data.

* * * * *